US010428858B1

(12) United States Patent
Lombardo et al.

(10) Patent No.: US 10,428,858 B1
(45) Date of Patent: Oct. 1, 2019

(54) HEAVY MACHINERY PIN WITH A PAWL

(71) Applicants: Pasquale Lombardo, Phoenix, AZ (US); Gaetano Lombardo, Phoenix, AZ (US)

(72) Inventors: Pasquale Lombardo, Phoenix, AZ (US); Gaetano Lombardo, Phoenix, AZ (US)

( * ) Notice: Subject to any disclaimer, the term of this patent is extended or adjusted under 35 U.S.C. 154(b) by 0 days.

(21) Appl. No.: 16/218,894

(22) Filed: Dec. 13, 2018

(51) Int. Cl.
F16B 21/16 (2006.01)
F16B 21/02 (2006.01)

(52) U.S. Cl.
CPC .............. F16B 21/16 (2013.01); F16B 21/02 (2013.01); F16B 2200/10 (2018.08)

(58) Field of Classification Search
CPC .......... F16B 21/02; F16B 21/12; F16B 21/16; F16B 2021/14; F16B 2200/10; E01B 9/12; Y10S 411/922
USPC .................................. 411/351, 356, 358, 362
See application file for complete search history.

(56) References Cited

U.S. PATENT DOCUMENTS

| | | |
|---|---|---|
| 2,487,084 A | 11/1949 | Weiss |
| 2,627,423 A | 2/1953 | Coperman |
| 2,629,281 A | 2/1953 | Baselt |
| RE23,878 E * | 9/1954 | Burdick ................... F16B 39/34 411/304 |
| 3,020,655 A | 2/1962 | Launder |
| 3,448,652 A | 6/1969 | Rhoads |
| 3,807,766 A | 4/1974 | Pleier et al. |
| 3,979,994 A | 9/1976 | Collignon |
| 4,067,657 A | 1/1978 | Kaarlela |
| 4,266,460 A * | 5/1981 | Klimowicz ............. F16B 39/04 411/315 |
| 4,285,380 A * | 8/1981 | Gulistan ............... F16B 5/0208 411/103 |
| 4,326,348 A | 4/1982 | Emrich |
| 4,557,631 A * | 12/1985 | Donan, Jr. ............ E21D 21/008 405/259.3 |
| 4,576,021 A | 3/1986 | Holden |
| 4,823,486 A | 4/1989 | Diekevers et al. |
| 5,410,826 A | 5/1995 | Immel et al. |
| 5,452,529 A | 9/1995 | Neuenfeldt |
| 5,638,621 A | 6/1997 | Keech et al. |
| 5,765,301 A | 6/1998 | Clendenning |
| 5,879,117 A | 3/1999 | Chen et al. |
| 6,055,832 A | 5/2000 | Wyers |
| 6,301,810 B1 | 10/2001 | Fidler |
| 6,343,808 B1 | 2/2002 | Luh |
| 6,537,006 B1 | 3/2003 | Clark |
| 6,672,115 B2 | 1/2004 | Wyers |
| 6,679,712 B2 | 1/2004 | Chang |

(Continued)

Primary Examiner — Roberta S Delisle
(74) Attorney, Agent, or Firm — Thomas W. Galvani, P.C.; Thomas W. Galvani

(57) ABSTRACT

A pin is used in a working surface of an element of heavy machinery. The heavy machinery element includes a first side, a second side, a bore formed though the working surface from the first side to the second side, and a helical groove extending from the first side to the second side and terminating with a lateral cavity extending into the working surface from the groove. The pin has a shank, a head on the shank, a blade projecting laterally from the head, and a pawl carried in the blade. The pawl allows rotation of the pin in the bore in a first direction and prevents rotation of the pin in the bore in an opposite second direction.

16 Claims, 5 Drawing Sheets

(56) References Cited

U.S. PATENT DOCUMENTS

| | | | |
|---|---|---|---|
| 7,708,510 B2 * | 5/2010 | Reimler | F16B 37/14 |
| | | | 24/455 |
| 8,282,675 B2 * | 10/2012 | Maguire | A61B 17/8047 |
| | | | 411/103 |
| 8,444,354 B2 | 5/2013 | Nielsen | |
| 8,458,931 B2 | 6/2013 | Knight | |
| 8,495,826 B2 | 7/2013 | Itou et al. | |
| 9,188,149 B2 * | 11/2015 | Bennett | F16B 41/005 |
| 9,239,070 B2 * | 1/2016 | Wiffen | F16B 21/04 |
| 2003/0206786 A1 | 11/2003 | Smith | |
| 2008/0276500 A1 | 11/2008 | Ruvang | |
| 2009/0165339 A1 | 7/2009 | Watanabe | |
| 2009/0199442 A1 | 8/2009 | Woerman et al. | |
| 2011/0000109 A1 | 1/2011 | Woerman et al. | |
| 2011/0258891 A1 | 10/2011 | Ruvang | |
| 2012/0250231 A1 * | 10/2012 | Xiao | H05K 5/0008 |
| | | | 361/679.01 |
| 2013/0247429 A1 | 9/2013 | Campomanes | |
| 2013/0280006 A1 * | 10/2013 | Desantis | G21C 7/12 |
| | | | 411/113 |
| 2014/0082977 A1 | 3/2014 | Pilon | |
| 2014/0314515 A1 * | 10/2014 | Baker | F16B 39/32 |
| | | | 411/326 |
| 2015/0082671 A1 | 3/2015 | Bierwith et al. | |
| 2015/0096207 A1 | 4/2015 | Tasovski | |
| 2018/0087554 A1 * | 3/2018 | Dreher | F16B 21/12 |

* cited by examiner

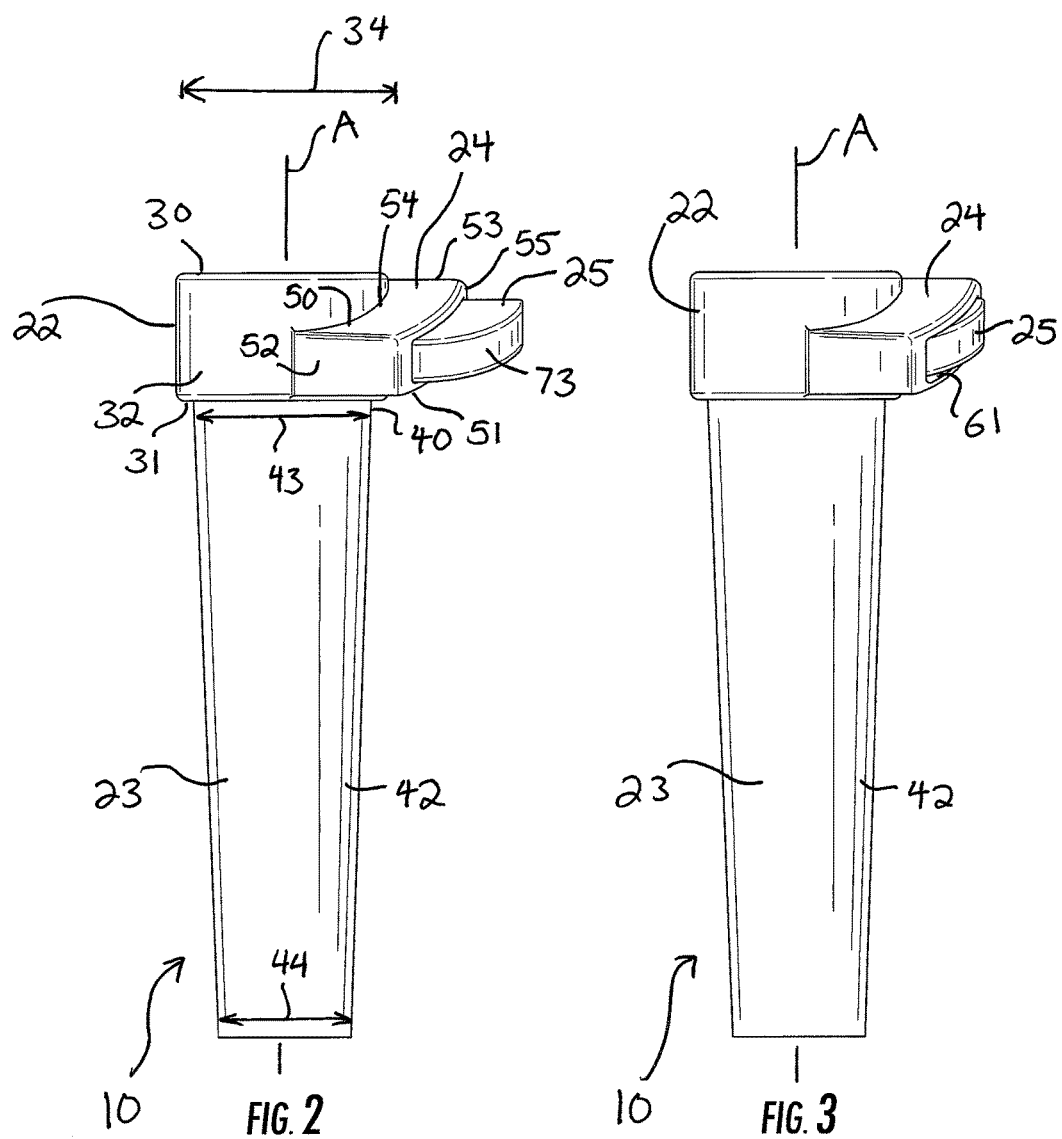

US 10,428,858 B1

HEAVY MACHINERY PIN WITH A PAWL

FIELD OF THE INVENTION

The present invention relates generally to heavy machinery equipment, and more particularly to fasteners for coupling heavy machinery parts.

BACKGROUND OF THE INVENTION

Heavy machinery equipment is used in mining, excavation, demolition, construction, and similar activities. The parts of heavy machines which are used for digging are exposed to a great amount of wear in operation. For instance, a ground engaging tool has teeth which continually dig, rip, cut, or lift dirt, rock, concrete, metal, or other rugged materials, all of which constantly wear against and abrade the surface of the teeth.

Heavy machinery parts are expensive and time-consuming to repair or replace, so many pieces of equipment are applied with wear plates or wear structures which can be replaced more quickly. For instance, on a ripper, the tooth may be a durable cover fitted onto the end of the ripper shank, so that when the tooth wears out, the tooth is removed and replaced without the need to repair the entire ripper shank. By removing and replacing only those parts which directly engage with the ground, considerable time and expense can be saved.

However, there are many safety issues with current designs of replacement parts. For example, current designs require that a sledgehammer be used to install and remove pins which secure the replacement parts on the ripper shank. The pins are hammered into the parts, and often a tool is placed against the pin and hammered with the sledgehammer. This can lead to serious injury if the tool moves, is broken, or the sledgehammer misses its mark. For example, if hammer is swung and misses the pin, oftentimes metal chips are broken off and sent careening; those chips seriously hurt people when they hit them. The safety organizations which regulate workplace safety, such as MSHA and OSHA, disapprove of pins and replacement parts which require sledgehammers for installation. Further, a sledgehammer is also frequently used to remove the pin, by hammering the pin out of the replacement part and the ripper shank. Again, this often leads to serious injury.

Many manufacturers of such replacement parts also incorporate unique or proprietary features in the parts that make removal and replacement difficult and expensive. Some manufacturers build replacement parts with special slots that will only accommodate their own tools. Others build parts that will only accept their own replacement parts. For instance, on a ripper shank, the end of the ripper shank may be specially formed to only accept a tooth from the same manufacturer that made the ripper shank. Similarly, the tooth may have a slot or other engagement feature that requires that a proprietary pin be used to couple the tooth to the end of the ripper shank, because a slot formed between the ripper shank and the tooth will only accept those pins. Still further, some manufacturers may create coupling pins that require uniquely-shaped keys or tools to install or remove the pins.

Ripper shanks are generally made from monolithic, or one-piece, steel plates which are available in a variety of sizes and shapes up to about 170 inches. Because of the risk of injury involved in removal of a replacement part from a ripper shank with a sledgehammer, many organizations will use a cutting torch to remove the replacement part. If a torch is used, an adapter must later be welded on to the ripper shank for future use with other replacement parts. This torch cutting and welding not only takes quite a lot of time and money, but creates a weak spot on the ripper shank which is predisposed to failure during use. Ripper shanks do not alone present this problem; many other heavy machinery parts are susceptible to these issues.

Further, not only do proprietary replacement parts prove to be expensive and difficult to replace because of the manufacturer's design choices, but replacement can be hampered when the part becomes worn or damaged severely. For example, if dirt builds up in the space between the tooth and end of a ripper shank, the tooth can bind to the ripper shank and be very difficult to remove, requiring crowbars and sledgehammers to remove. If dirt clogs the socket or keyway which receives the key or tool, removal can also be difficult. An improved fastening device for coupling heavy equipment parts is needed.

SUMMARY OF THE INVENTION

A pin is used in a working surface of an element of heavy machinery. The heavy machinery element includes a first side, a second side, a bore formed though the working surface from the first side to the second side, and a helical groove extending from the first side to the second side and terminating with a lateral cavity extending into the working surface from the groove. The pin has a shank, a head on the shank, a blade projecting laterally from the head, and a pawl carried in the blade. The pawl allows rotation of the pin in the bore in a first direction and prevents rotation of the pin in the bore in an opposite second direction. In embodiments, two pins are used to secure the working surface; one pin is applied from each side of the heavy machinery to secure the working surface without the use of or need for a hammer.

The above provides the reader with a very brief summary of the detailed description presented below, and is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings:

FIGS. 2 and 3 are side elevation views of the pin of FIG. 1 with the pawl in normal and compressed conditions, respectively.

DETAILED DESCRIPTION

Figure 1:
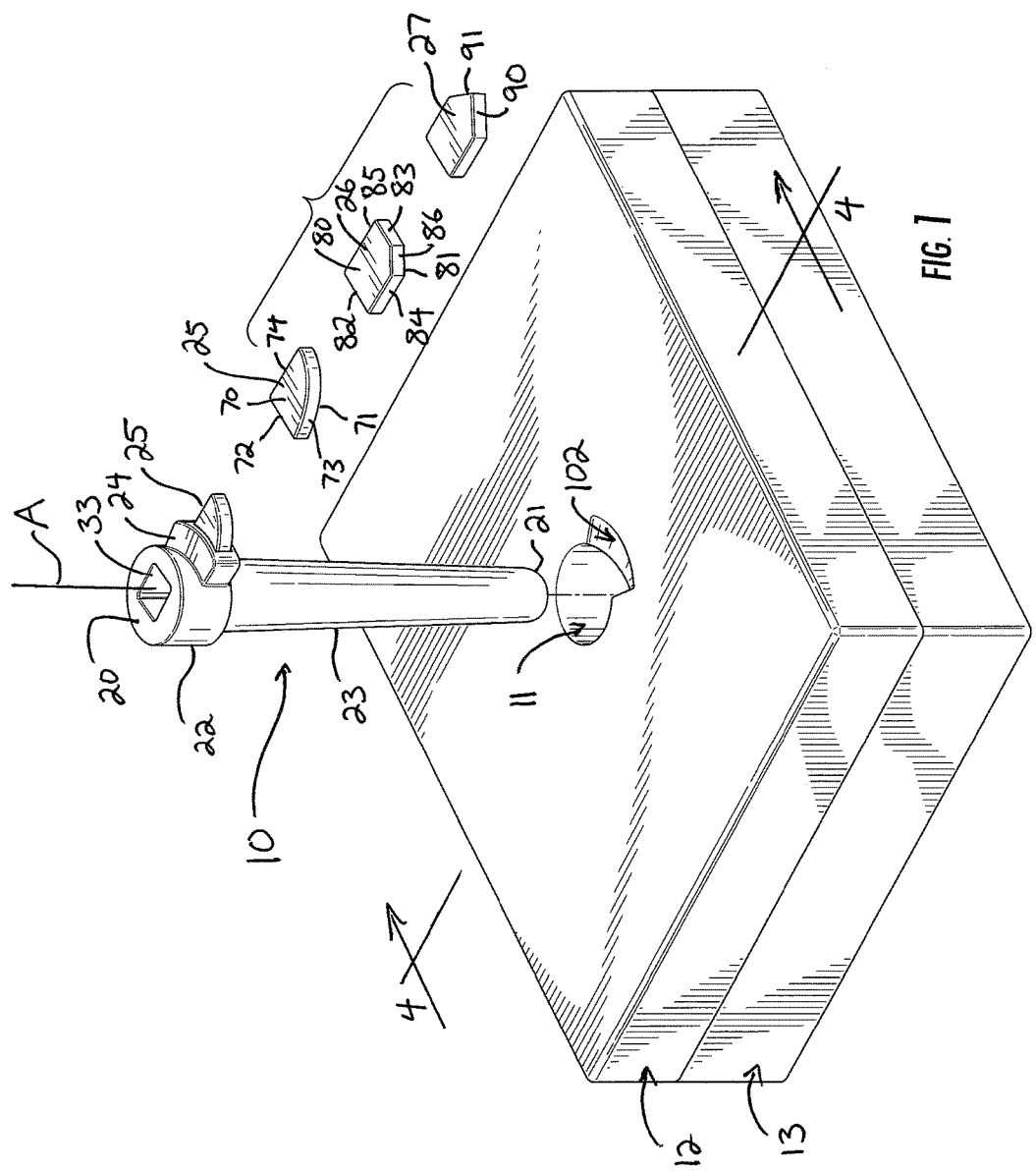
FIG. 1 is a top perspective view of a heavy machinery pin with a pawl, disposed above a working surface formed with a bore to accept the pin.

Reference now is made to the drawings, in which the same reference characters are used throughout the different figures to designate the same elements. FIG. 1 is a top perspective view of a heavy machinery pin 10 disposed above a bore in a working surface 12 of a workpiece of heavy machinery equipment. The working surface 12 is disposed over a mating element 13. The working surface 12 may be, for example, the side of a ripper tooth. In such an embodiment, the ripper tooth is fit onto a mating element 13 of a ripper shank, and so the pin 10 secures the ripper tooth on the ripper shank. The drawings herein depict one working surface 12, and thus one side of a workpiece like a ripper tooth. However, the pin 10 is preferably used in a two-pin assembly; one pin 10 is applied on one side of the workpiece, and another pin 10 is applied on the other side of the workpiece. With two pins 10 applied on either side of the workpiece, the workpiece is securely held on the mating element 13 without the use of or need for a hammer.

The pin 10 has a top 20, a bottom 21, and a length between the top 20 and bottom 21 extending along a longitudinal axis A. Proximate the top 20, the pin 10 has a head 22. A shank 23 extends downward from the head 22 to the bottom 21. A blade 24 projects laterally from the head 22, and a pad 25 is carried in the blade 24. FIG. 1 illustrates the pad 25 both applied and removed from the blade 24, and two other embodiments of pads 26 and 27 are shown as well. The pads 25, 26, and 27 are each compressible to control application and removal of the pin 10 to and from the bore 11.

Referring now to FIGS. 1-3, the head 22 has a top 30, an opposed bottom 31, and a body therebetween. The body has a generally cylindrical outer surface 32 extending between the top 30 and the bottom 31. The top 30 and bottom 31 are both flat and oriented normally with respect to the axis A, and the outer surface 32 is coaxial to the axis A and thus normal to the top 30 and bottom 31. The outer surface 32 defines an outer diameter 34 of the head 22. This outer diameter 34 is constant between the top 30 and bottom 31.

A square socket 33 is formed into the body of the head 22 from the top 30. The socket 33 accepts a square-headed wrench so that the pin 10 can be rotated in a first direction to engage and apply the pin 10 in the bore 11 or in an opposite second direction to disengage and remove the pin 10 from the bore 11. The square socket 33 is less prone to accumulation and compacting of dirt, dust, and other debris.

The head 22 is solid, constructed of a material or combination of materials having characteristics of ruggedness, durability, rigidity, and hardness, such as iron or steel, and is preferably integrally and monolithically formed or cast to the shank 23.

The shank 23 extends from the bottom 31 of the head 22. The shank 23 has a top 40, an opposed bottom 41, and a body therebetween. The bottom 41 is flat, and the top 40 and bottom 41 are both oriented normally with respect to the axis A. The shank 23 is solid and, since it is formed integrally and monolithically to the head 22, is constructed from the same material or combination of materials.

The body of the shank 23 has a slightly tapered or conical outer surface 42. At the top 40 of the shank 23, the body has an outer diameter 43 which is larger than an outer diameter 44 at the bottom 41. The outer surface 42 tapers continuously and constantly from the top 40 to the bottom 41. The taper improves the ease with which the pin 10 is applied and removed from the bore 11. In some embodiments, the shank 23 is straight and not tapered.

Referring now primarily to FIGS. 2 and 3, the blade 24 projects laterally from the outer surface 32. The blade 24 is formed integrally and monolithically to the head 22. The blade 24 has a top 50, an opposed bottom 51, a front end 52, and an opposed rear end 53. The blade 24 extends from a proximal end 54 formed on the outer surface 32 to a distal end 55 opposite the proximal end 54.

Figure 5:
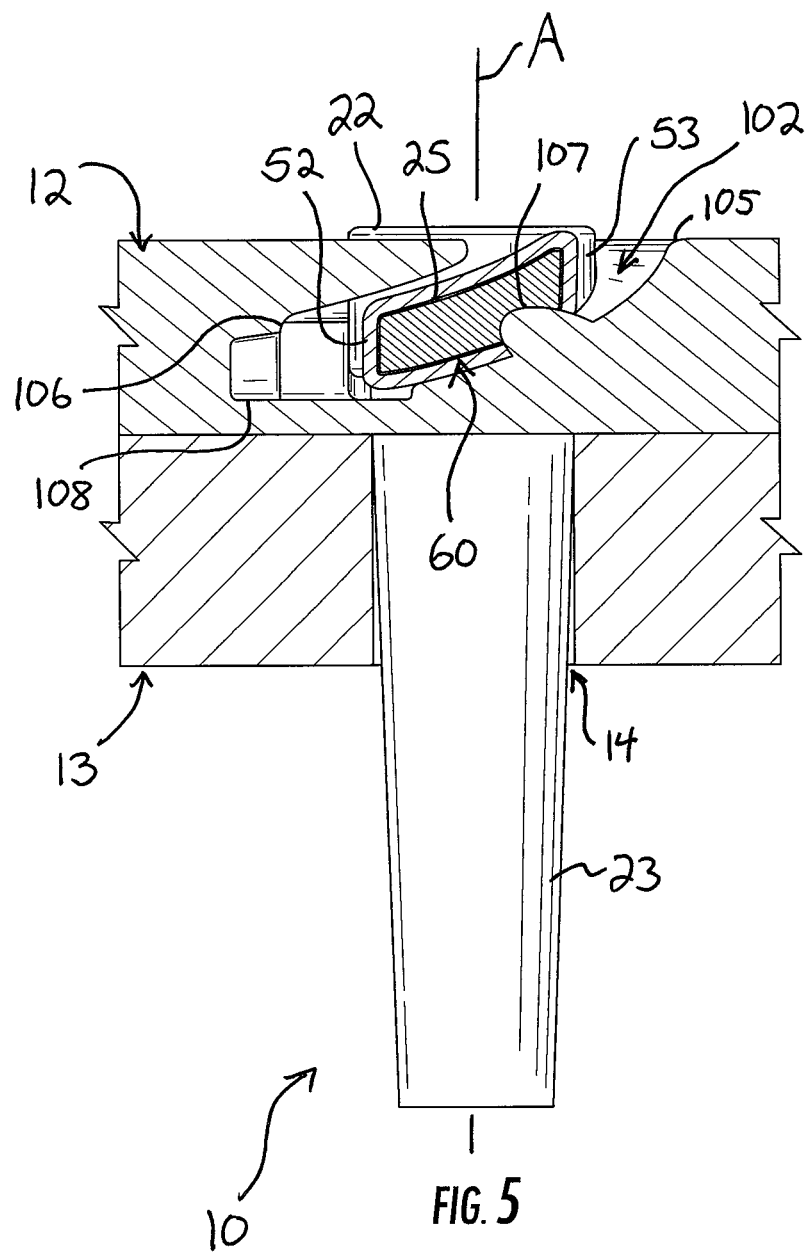

Still referring to FIGS. 2 and 3, but also to the section view of FIG. 5, the blade 24 is pitched between the front and rear ends 52 and 53. The front and rear ends 52 and 53 are both blunt and oriented parallel to the axis A. The top 50 and bottom 51, however, drop; they are each oriented obliquely with respect to the axis A and have a slight concave curve. From the rear end 53, each of the top 50 and bottom 51 declines in a concave fashion to the front end 52. As such, in cross-section, the blade 24 generally has a rhomboid shape. Though the top 50 and bottom 51 each decline from the rear end 53 to the front end 52, they are spaced apart by a constant distance. In other words, the blade 24 has a constant vertical thickness between the top 50 and bottom 51.

Figure 4:
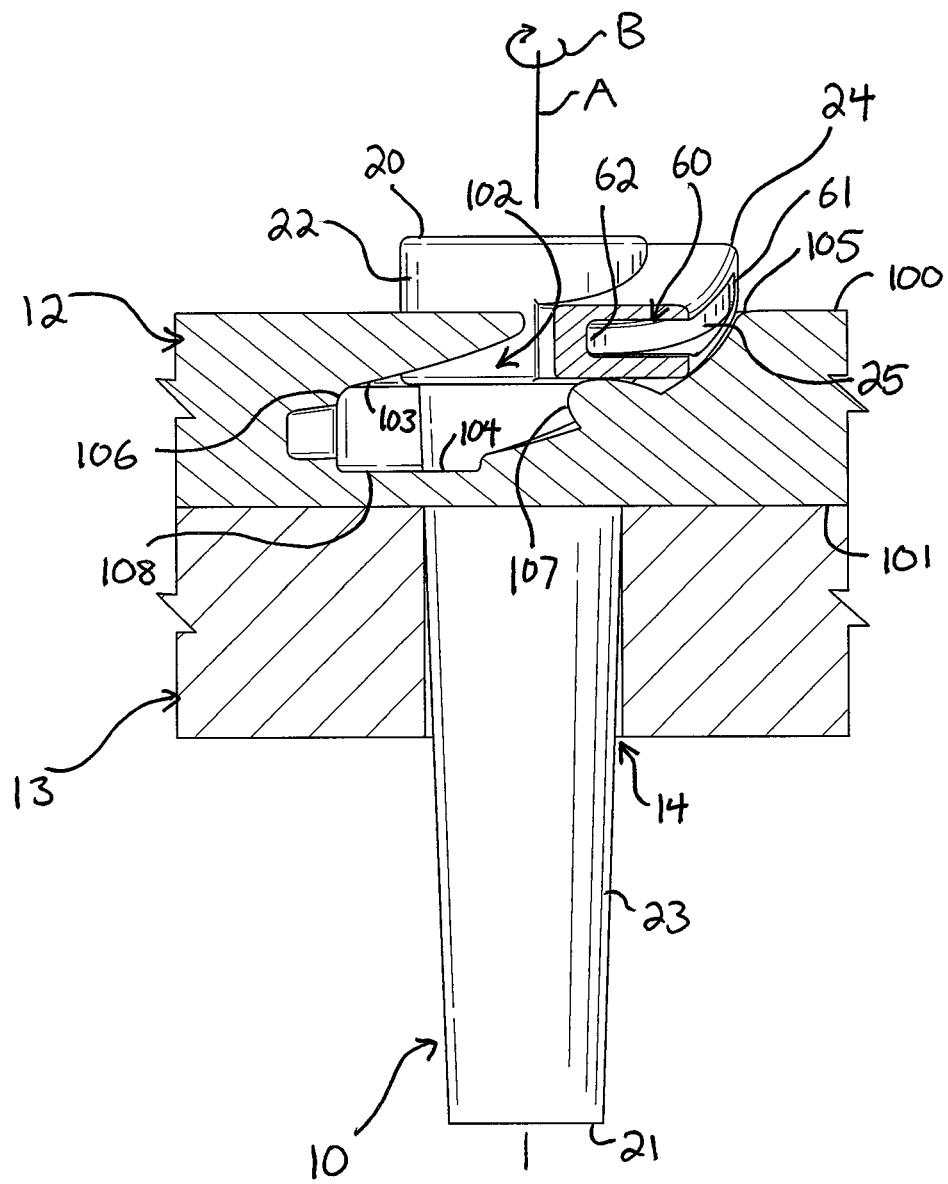
FIGS. 4, 5, and 6 are section views taken along the line 4-4 in FIG. 1, illustrating steps of the pin of FIG. 1 being applied through the bore in the working surface of FIG. 1.

Referring now to FIGS. 2-4, a hold 60 is formed within the blade 24 for carrying the pad 25. The hold 60 extends into the blade 24 from a lateral opening 61 in the distal end 55. The opening 61 generally has a rhomboid shape, and the hold 60 recedes laterally from the opening 61 in a direction normal to the axis A. The hold 60 extends within the blade 24 to an endwall 62 near to the proximal end 54 such that the hold 60 occupies nearly the entirety of the blade 24. The endwall 62 is flat and normal to interior sides of the hold 60, which all extend parallel to each other from the endwall 62 to the opening 61.

The pad 25 is carried in the hold 60 for compression. The pad 25 is constructed from a material or combination of materials having characteristics of compressibility, resiliency, and shape memory. The shape and compressibility of the pad 25 allow it to function as a pawl, moving between a normal condition (shown in FIG. 2) and a compressed condition (shown in FIG. 3) to prevent and allow movement of the pin 10 through the bore 11.

The pad 25 shown throughout the drawings has a top 70, an opposed bottom 71, an inner end 72, a curved outer surface 73, and a rear end 74. When applied to the hold 60, the inner end 72 of the pad 25 is directed toward the endwall 62 and the top 70 is directed toward the top 50 of the blade 24. The outer surface 73 is rounded and so tapers away from the front of the inner end of the pad 25. As such, when the pad 25 is applied in the hold 60, there is a slight gap between the outer surface 73 and the hold 60. The rest of the pad 25, however, is snugly received; the top 70, the bottom 71, and the rear end 74 are snugly received in contact against the sides of the hold 60.

The pads 26 and 27 are similar to the pad 25. The pad 26 may also be carried in the hold 60 for compression, and is also constructed from a material or combination of materials having characteristics of compressibility, resiliency, and shape memory. The shape and compressibility of the pad 26 also allow it to function as a pawl, moving between a normal condition and a compressed condition to prevent and allow movement of the pin 10 through the bore 11. The pad 27 has a top 80, an opposed bottom 81, an inner end 82, an outer end 83, a front end 84, a rear end 85, and a diagonal face 86. When applied to the hold 60, the inner end 82 of the pad 26 is directed toward the endwall 62, and the top 80 is directed toward the top 50 of the blade 24. The pad 26 is snugly received in the hold 60; the top 80, the bottom 81, and the front and rear ends 84 and 85 are snugly received in contact against the sides of the hold 60. In the normal condition of the pad 26, the diagonal face 86 is disposed beyond the hold 60. When the pad 26 is compressed, the diagonal face 86 is within the hold 60.

The pad 27 may also be carried in the hold 60 for compression, and is also constructed from a material or combination of materials having characteristics of compressibility, resiliency, and shape memory. The shape and compressibility of the pad 27 allow it to function as a pawl, moving between a normal condition and a compressed condition to prevent and allow movement of the pin 10 through the bore 11. The pad 27 has a top, an opposed bottom, an inner end, front end, a rear end, a diagonal front face 90, and a diagonal rear face 91. When applied to the hold 60, the inner end of the pad 27 is directed toward the endwall 62, and the top is directed toward the top 50 of the blade 24. The pad 27 is snugly received in the hold 60; the top, bottom, and front and rear ends are snugly received in contact against the sides of the hold 60. In the normal condition of the pad 27, the diagonal front and rear faces 90 and 91 are disposed beyond the hold 60. When the pad 27 is compressed, the diagonal front and rear faces 90 and 91 are within the hold 60.

In operation, the pin 10 is useful for securing the working surface 12 to the mating element 13, such as a ripper shank. Initially, the working surface 12 is applied over the mating element 13, such that the bore 11 registers with a bore 14 in the mating element 13. The pin 10 is then picked up, such as by hand, the bottom 21 is directed toward the bore 11 with the top 20 directed away, and the axis A is aligned coaxially to the bore 11. The worker applies the shank 23 into the bore 11. The pin 10 moves through the bore 11 until the head 22 reaches the bore 11.

The bore 11 is uniquely formed in the working surface 12 to accept the pin 23. The working surface 12 has a first or outer side 100 and an opposed second or inner side 101. The bore 11 extends entirely through the working surface 12 from the outer side 100 to the inner side 101. A helical groove 102 extends from the outer side 100 toward the inner side 101 but preferably does not extend entirely through the inner side 101. The groove 102 extends into the working surface 13 laterally from the bore 11. It has a sloped upper surface 103 and a sloped lower surface 104 which are spaced apart from each other an equal distance from a top 105 of the groove 102 to a bottom 106. Between the top 105 and bottom 106, projecting into the groove 102 from the lower surface 104, is a protrusion 107. The protrusion 107 projects approximately halfway from the lower surface 104 to the upper surface 103 and is angled toward the bottom 106 of the groove 102. At the bottom 106, a lateral cavity 108 is formed into the working surface 12. The lateral cavity 108 is a cavity extending laterally away from the bottom 106 of the groove 102, parallel to the inner side 101 of the working surface 12. The lateral cavity 108 is sized to receive the pad 25.

Thus, the pin 23 is moved through the bore 11 until the head 22 reaches the bore 11, at which point the pin 10 is also rotated in a first direction, indicated in FIG. 4 with the arcuate arrowed line B. This rotates the pin 10 so that the blade 24 becomes registered with the top 105 of the groove 102. Rotation in the direction B while advancing the pin 10 downward causes the blade 24 to enter the groove 102. Before entering, the pad 25 is in the normal condition (shown in FIG. 2); the pad 25 is carried in the hold 60 of the blade 24 but a portion of the pad 25 extends out of the lateral opening 61 of the hold 60 beyond the blade 24, because the pad 25 is under no stress and is not compressed. Once the head 22 enters the bore 11, however, and the blade 24 enters the groove 102, the groove 102 pushes the pad 25 into the hold to tightly compress the pad 25. FIG. 4 thus show the pad 25 moved into the compressed condition thereof, where the pad 25 is withdrawn within the blade 24.

The worker continues to rotate the pin 10 in the direction B and advance the pin 10 downward through the bore 11 until the pad 25 reaches the protrusion 107, as shown in FIG. 5. The protrusion 107 further compresses the pad 25 fully within the hold 60. At the protrusion 107, the pad 25 acts as a pawl; it allows rotation of the pin 10 in the bore 11 in the direction B but prevents rotation of the pin 10 in the bore 11 opposite to the direction B.

Figure 6:
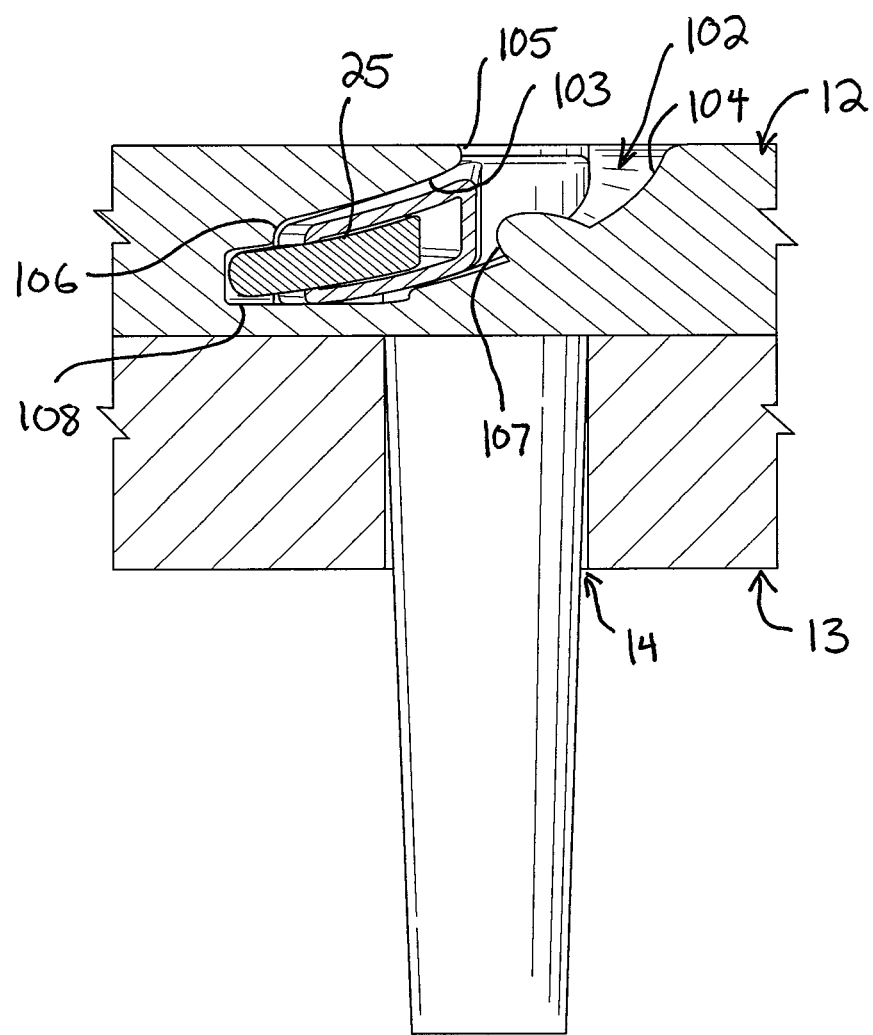

Continued rotation and advancement of the pin 10 moves the pad 25 beyond the protrusion 107 until the head 22 reaches the bottom 106 of the groove 102, as shown in FIG. 6. There, the pad 25 moves out of the compressed condition into the normal condition thereof; the pad 25 returns to the normal condition by expanding into the lateral cavity 108.

The pad 25 thus creates an interference fit with the lateral cavity 108 which prevents the pin 10 from being inadvertently rotated in the second direction opposite direction B. If the worker desires to remove the pin 10, the worker picks up a square wrench, inserts it into the socket 33, and rotates the pin 10 with great force opposite to the direction B. This causes the pad 25 to tear, sever, or otherwise break. The pin 10 can then be easily rotated and withdrawn from the bore 11. The broken remnants of the pad 25 are loose in the bore 11, and generally will drop out on their own.

A preferred embodiment is fully and clearly described above so as to enable one having skill in the art to understand, make, and use the same. Those skilled in the art will recognize that modifications may be made to the description above without departing from the spirit of the invention. To the extent that such modifications do not depart from the spirit of the invention, they are intended to be included within the scope thereof.

The invention claimed is:

1. A pin comprising:
   a shank;
   a head on the shank;
   a blade projecting laterally from the head;
   a pawl carried in the blade, the pawl allowing rotation of the pin in a first direction and preventing rotation of the pin an opposite second direction; and
   a hold formed within the blade and having a lateral opening at a distal end of the blade;
   the pawl is carried in the hold and moves between a compressed condition and a normal condition;
   in the compressed condition, the pawl is withdrawn within the blade; and
   in the normal condition, the pawl extends out of the lateral opening, beyond the blade.

2. The pin of claim 1, wherein the blade is pitched.

3. The pin of claim 1, wherein the blade has a constant vertical thickness.

4. The pin of claim 3, wherein the blade has blunt front and rear ends.

5. The pin of claim 1, wherein the pawl is a compressible pad.

6. The pin of claim 5, wherein the compressible pad has a rounded outer surface.

7. A capture assembly comprising:
   a working surface including a first side, a second side, a bore formed though the working surface from the first side to the second side, and a helical groove extending from the first side to the second side and terminating with a lateral cavity extending into the working surface from the groove;
   a pin comprising a shank, a head on the shank, a blade projecting laterally from the head, and a pawl carried in the blade;
   wherein the pawl allows rotation of the pin in the bore in a first direction and prevents rotation of the pin in the bore in an opposite second direction; and
   a hold formed within the blade and having a lateral opening at a distal end of the blade;
   the pawl is carried in the hold and moves between a compressed condition and a normal condition;

in the compressed condition, the pawl is withdrawn within the blade; and in the normal condition, the pawl extends out of the lateral opening, beyond the blade.

8. The pin of claim 7, wherein the blade is pitched.

9. The pin of claim 8, wherein the blade has a constant vertical thickness.

10. The pin of claim 9, wherein the blade has blunt front and rear ends.

11. The pin of claim 8, wherein the pawl is a compressible pad.

12. The pin of claim 11, wherein the compressible pad has a rounded outer surface.

13. A capture assembly comprising:

a working surface including a first side, a second side, a bore formed though the working surface from the first side to the second side, and a helical groove extending from the first side to the second side and terminating with a lateral cavity extending into the working surface from the groove;

a pin comprising a shank, a head on the shank, a blade projecting laterally from the head, and a compressible pad on the head which moves between a compressed condition and a normal condition in response to movement of the pin through the bore of the working surface;

wherein the compressible pad allows rotation of the pin in the bore in a first direction and prevents rotation of the pin in the bore in an opposite second direction; and a hold formed within the blade and having a lateral opening at a distal end of the blade; and the compressible pad is carried in the hold;

in the compressed condition, the compressible pad is withdrawn within the blade; and in the normal condition, the compressible pad extends out of the lateral opening, beyond the blade.

14. The pin of claim 13, wherein the blade is pitched.

15. The pin of claim 13, wherein the blade has a constant vertical thickness.

16. The pin of claim 15, wherein the blade has blunt front and rear ends.

* * * * *